United States Patent
Tse et al.

(10) Patent No.: US 7,542,617 B1
(45) Date of Patent: *Jun. 2, 2009

(54) METHODS AND APPARATUS FOR MINIMIZING REQUANTIZATION ERROR

(75) Inventors: Yi Tong Tse, San Jose, CA (US); Bipin Todur, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 11/860,462

(22) Filed: Sep. 24, 2007

Related U.S. Application Data

(63) Continuation of application No. 10/626,485, filed on Jul. 23, 2003, now Pat. No. 7,289,680.

(51) Int. Cl.
G06K 9/00 (2006.01)

(52) U.S. Cl. .................. 382/251; 382/252; 382/248

(58) Field of Classification Search ............. 382/251, 382/252, 245, 248, 309; 358/537, 538; 341/55; 386/4; 715/719; 704/500, 229, 201, 230, 704/503, 200.1
See application file for complete search history.

(56) References Cited

U.S. PATENT DOCUMENTS

| | | | | |
|---|---|---|---|---|
| 3,868,603 A | 2/1975 | Guidoux | ............ | 333/18 |
| 5,341,318 A | 8/1994 | Balkanski et al. | ........... | 708/402 |
| 5,768,537 A | 6/1998 | Butter et al. | ............... | 709/247 |
| 5,956,674 A * | 9/1999 | Smyth et al. | .............. | 704/200.1 |
| 5,974,380 A * | 10/1999 | Smyth et al. | ................ | 704/229 |
| 5,978,762 A * | 11/1999 | Smyth et al. | ................ | 704/229 |
| 6,167,161 A | 12/2000 | Oami | ........................ | 382/250 |
| 6,401,062 B1 | 6/2002 | Murashima | ................ | 704/223 |
| 6,415,060 B1 | 7/2002 | Oami | ........................ | 382/250 |
| 6,487,535 B1 * | 11/2002 | Smyth et al. | ................ | 704/500 |
| 6,775,325 B1 | 8/2004 | Florencio | ............... | 375/240.03 |

OTHER PUBLICATIONS

Bauschke et al., "A Requantization-based Method for Recompressing JPEG Images", IEEE, 0-7803-7402-9/02, 2002, pp. 2489-2492.
Overview of MPEG-2 Test Model 5, TM5 Overview, retrieved from website www.mpeg.org/MPEG/MSSG/tm5/overview.html 5 pages, unknown date.
ISO/IEC 13818-2: 1995, Recommendation ITU-T H.262 (1995) 243 pages.

* cited by examiner

*Primary Examiner*—Anh Hong Do
(74) *Attorney, Agent, or Firm*—Weaver Austin Villeneuve & Sampson LLP

(57) ABSTRACT

Techniques and mechanisms for performing error minimizing requantization are provided. Quantized coefficients associated with a bitstream are received. It is determined whether the quantized coefficients are associated with an inter macroblock or an intra macroblock. Inter macroblock and intra macroblock formulas minimizing requantization error are applied to determine requantized coefficients.

20 Claims, 8 Drawing Sheets

METHODS AND APPARATUS FOR MINIMIZING REQUANTIZATION ERROR

CROSS-REFERENCE TO RELATED APPLICATIONS

The present invention is a continuation of and claims priority to U.S. patent application Ser. No. 10/626,485, filed Jul. 23, 2003, now U.S. Pat. No. 7,289,680 which is incorporated herein by reference in its entirety.

BACKGROUND OF THE INVENTION

The present invention relates to quantization. More specifically, the present invention relates to improved mechanisms for requantization of transform coefficients to reduce the bitrate of encoded bitstreams.

Video data is one particularly relevant form of data that can benefit from improved techniques for resealing. Video resealing schemes allow digitized video frames to be represented digitally in an efficient manner. Resealing digital video makes it practical to transmit the compressed signal by digital channels at a fraction of the bandwidth required to transmit the original signal without compression. Generally, compressing data or further compressing compressed data is referred to herein as resealing data. International standards have been created on video compression schemes. The standards include MPEG-1, MPEG-2, MPEG-4, H.261, H.262, H.263, H.263+, etc. The standardized compression schemes mostly rely on several key algorithm schemes: motion compensated transform coding (for example, DCT transforms or wavelet/sub-band transforms), variable length coding (VLC), and quantization of the transform coefficients.

The motion compensated encoding removes the temporally redundant information inherent in video sequences. The transform coding enables orthogonal spatial frequency representation of spatial domain video signals. Quantization of the transformed coefficients reduces the number of levels required to represent a given digitized video sample and reduces bit usage in the compression output stream. The other factor contributing to rescaling is variable length coding (VLC) that represents frequently used symbols using code words. In general, the number of bits used to represent a given image determines the quality of the decoded picture. The more bits used to represent a given image, the better the image quality. The system that is used to compress digitized video sequence using the above described schemes is called an encoder or encoding system.

More specifically, motion compensation performs differential encoding of frames. Certain frames, such as I-frames in MPEG-2, continue to store the entire image, and are independent of other frames. Differential frames, such as B-frames or P-frames in MPEG-2, store motion vectors associated with the difference in the frames. The pixel-wise difference between objects is called the error term. In MPEG-2, P-frames reference a single frame while B-frames reference two different frames. Although this allows fairly high reduction ratios, motion compensation is limited when significant changes occur between frames. When significant changes occur between frames in a video sequence, a large number of frames are encoded as reference frames. That is, entire images and not just motion vectors are maintained in a large number of frames. This precludes high reduction ratios. Furthermore, motion compensation can be computationally expensive.

Each frame can be converted to luminance and chrominance components. As will be appreciated by one of skill in the art, the human eye is more sensitive to the luminance resolution than to the chrominance resolution of an image. In MPEG-2, luminance and chrominance frames are divided into 8×8 pixel blocks. The 8×8 pixel blocks are transformed using a discrete cosine transform (DCT) and scanned to create a DCT coefficient vector. Quantization involves dividing the DCT coefficients by a scaling factor. The divided coefficients can be rounded to the nearest integer. After quantization, some of the quantized elements become zero. The many levels represented by the transform coefficients are reduced to a smaller number of levels after quantization. With fewer levels represented, more sequences of numbers are similar. For example, the sequence 8.9 4.1 6.2 1.9 after division by two and rounding becomes 4 2 3 1. Quantization is an irreversible process and hence introduces unrecoverable loss of information associated with the original frame or image.

During transmission of video frames, network requirements often dictate that allowed bitrates change. For example, video frames may have to be rescaled further or compressed further to allow transmission onto a particular subnetwork. Requantization is one mechanisms to further rescale or compress an already compressed video stream. The levels represented by quantized transform coefficients are further reduced to a smaller number of levels after requantization. With fewer levels represented, more sequences of numbers are similar. For example, the quantized sequence of 4 2 3 1 after another division by two and rounding becomes 2 1 2 1. Requantization is similarly an irreversible process and hence introduces further loss of information associated with the original frame or image. Consequently, it is desirable to provide improved techniques for minimizing error and inaccuracies due to requantization.

SUMMARY OF THE INVENTION

According to the present invention, methods and apparatus for performing error minimizing requantization are provided. Quantized coefficients associated with a bitstream are received. It is determined whether the quantized coefficients are associated with an inter macroblock or an intra macroblock. Inter macroblock and intra macroblock formulas minimizing requantization error are applied to determine requantized coefficients.

In one embodiment, a method for requantizing coefficients of a bit stream is provided. A plurality of input coefficients $(F_i)$ quantized at an input quantization scale $(q_i)$ are received. The input coefficients are associated with the bit stream. An output quantization scale $(q_o)$ is provided. The output quantization scale is greater than the input quantization scale to allow for rate reduction of the bit stream. A plurality of output coefficients $(F_o)$ quantized at the output quantization scale are transmitted. The plurality of output coefficients are determined using a formula minimizing the difference between dequantized input coefficients $(f_i)$ and dequantized output coefficients $(f_o)$.

In another embodiment, an apparatus for requantizing coefficients of a bit stream is provided. The apparatus includes an input interface, a processor, and an output interface. The input interface is configured to receive a plurality of input coefficients $(F_i)$ quantized at an input quantization scale $(q_i)$. The input coefficients are associated with the bit stream. A processor is configured to provide an output quantization scale $(q_o)$. The output quantization scale is greater than the input quantization scale to allow for rate reduction of the bit stream. An output interface is configured to transmit a plurality of output coefficients $(F_o)$ quantized at the output quantization scale. The plurality of output coefficients are determined using a formula minimizing the difference between dequantized input coefficients ($f_i$) and dequantized output coefficients ($f_o$).

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Many techniques for data compression are currently available. One technique for video compression is MPEG-2. MPEG-2 uses motion compensation, discrete cosine transforms, quantization, and variable length coding to scale data. Some of the more computationally expensive aspects of data compression schemes are the inverse transform operations that are used to convert transform coefficients into data values. Transform operations are used during several stages including decoding or resealing of encoded data. Rescaling data is described in patent application Ser. No. 09/766,020 titled Methods For Efficient Bandwidth Scaling Of Compressed Video Data at the date of filing on Jan. 18, 2001, the entirety of which is hereby incorporated by reference for all purposes.

The present invention provides techniques for improving upon the accuracy of requantizing transform coefficients. Any mechanism for quantizing already quantized coefficients to a different, typically larger scale is referred to herein as requantization. For example, a video stream has coefficients ranging between 0 and 99. To allow more efficient transform, the coefficients can be quantized using a quantization scale of 10. Applying the quantization scale of 10 in a simplified case would mean dividing each video stream coefficient by 10 and rounding towards 0.

Any value indicating a step size for quantization is referred to herein as a quantization scale. In one instance, a video stream having coefficients of 35 37 24 89 2 and 93 would be quantized to 3 3 2 8 0 and 9 upon applying a quantization scale of 10. The quantized coefficients of 3 3 2 8 0 and 9 could be transmitted more efficiently using fewer bits. In this simplified case, quantizating the bitstream using a quantization scale of 10 would yield 10 possible quantization levels, or 0 1 2 3 4 5 6 7 8 9 corresponding to 0 10 20 30 40 50 60 70 80 and 90. When the quantized coefficients are dequantized, the values of 30 30 20 80 0 and 90 are provided. The output values are an approximation of the original coefficients.

Figure 1:
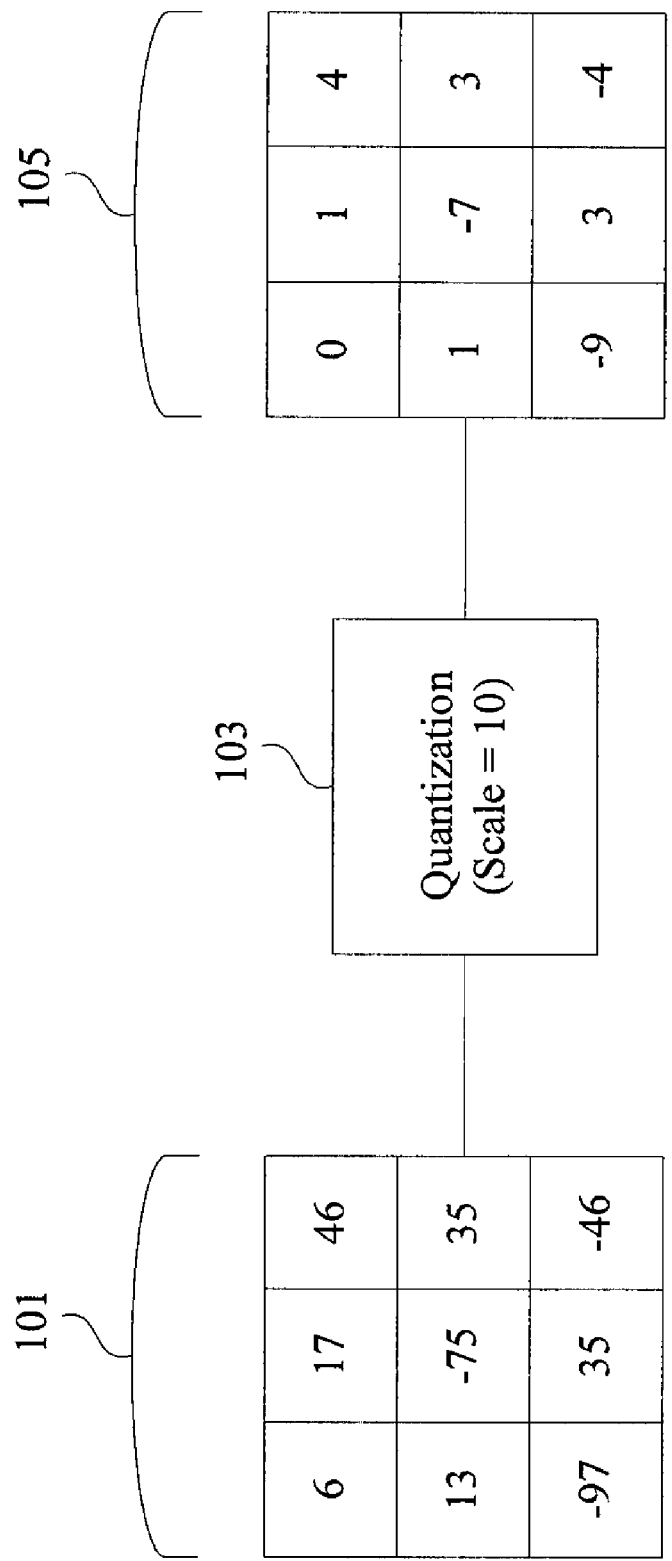
FIG. 1 is a diagrammatic representation showing quantization at a particular quantization scale.

FIG. 1 is a diagrammatic representation of a system applying quantization. Coefficients shown in matrix 101 have not yet been quantized. The values in matrix 101 can range from −99 to 99 representing 199 possible values. It would require 8 bits to represent each of the possible 199 values in the matrix. In order to reduce the bitrate of the stream including the coefficients, a quantization scale of 10 is applied at 103 to matrix 101 to derive quantized coefficients in matrix 105. The values of 6 17 46 13 -75 35 -97 35 and −46 in matrix 101 are quantized to values of 0 1 4 1 -7 3 -9 3 and −4, in one instance by using simple division and rounding towards zero. By applying a quantization scale of ten, the number of possible values has been reduced from 199 to 19. The number of quantization levels is now 19. The 19 values can now each be represented using only 5 bits instead of the original 8 bits.

Figure 2:
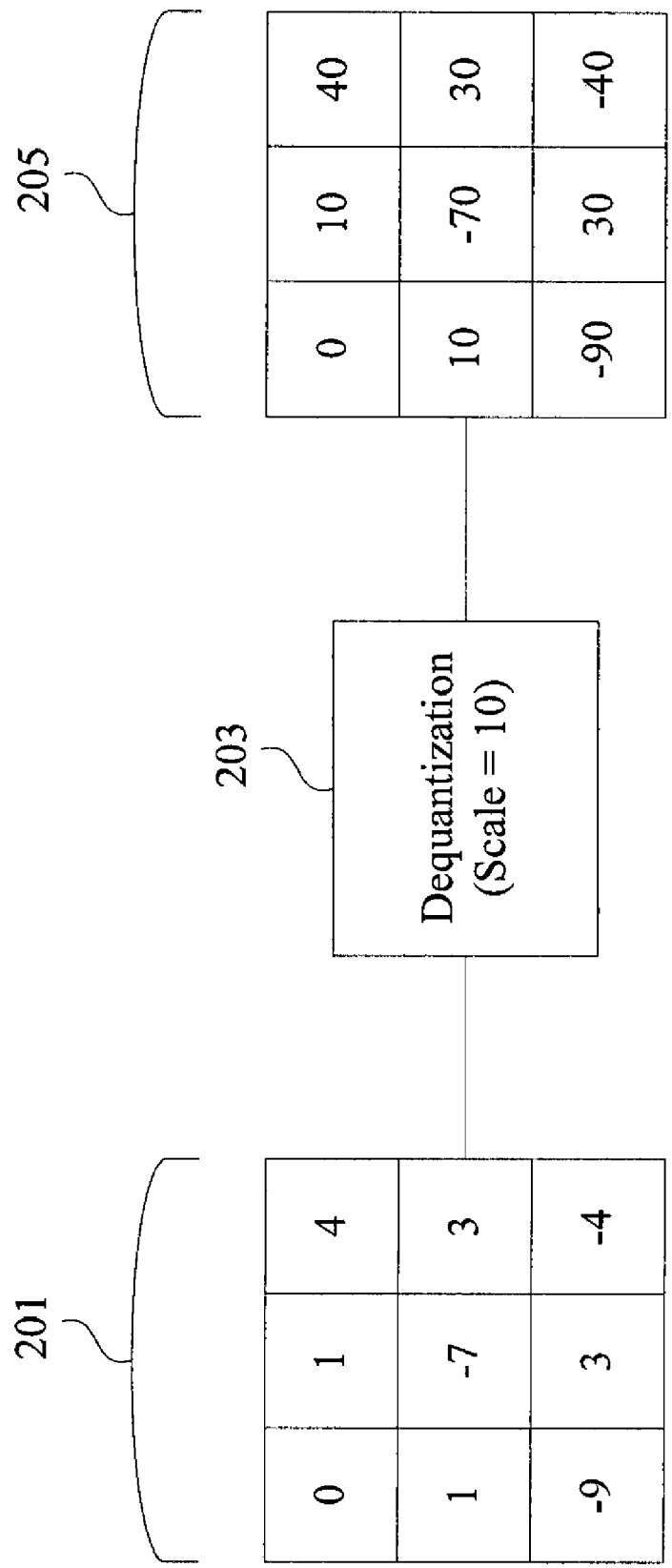
FIG. 2 is a diagrammatic representation showing dequantization at a particular quantization scale.

FIG. 2 is a diagrammatic representation showing dequantization. After coefficients are quantized, the coefficients are transmitted with information allowing a receiver to dequantize the coefficients to obtain approximations of the original values. Matrix 201 shows quantized coefficients. The coefficients are dequantized at 203 using the same quantization scale to provide matrix 205. In a simplified example, dequantization is accomplished by multiplying each quantized coefficient by the dequantization scale. It should be noted that dequantization typically entails operations with other weighting values and constants. However, in the simplified case, quantized coefficients 0 1 4 1 -7 3 -9 3 and −4 are dequantized to values 0 10 40 10 −70 30 −90 30 and −40. The dequantized values are approximations of the original data coefficients. In many instances, the dequantized values can then be provided to an output device such as a monitor as luminance values for pixels, for example.

Figure 3:
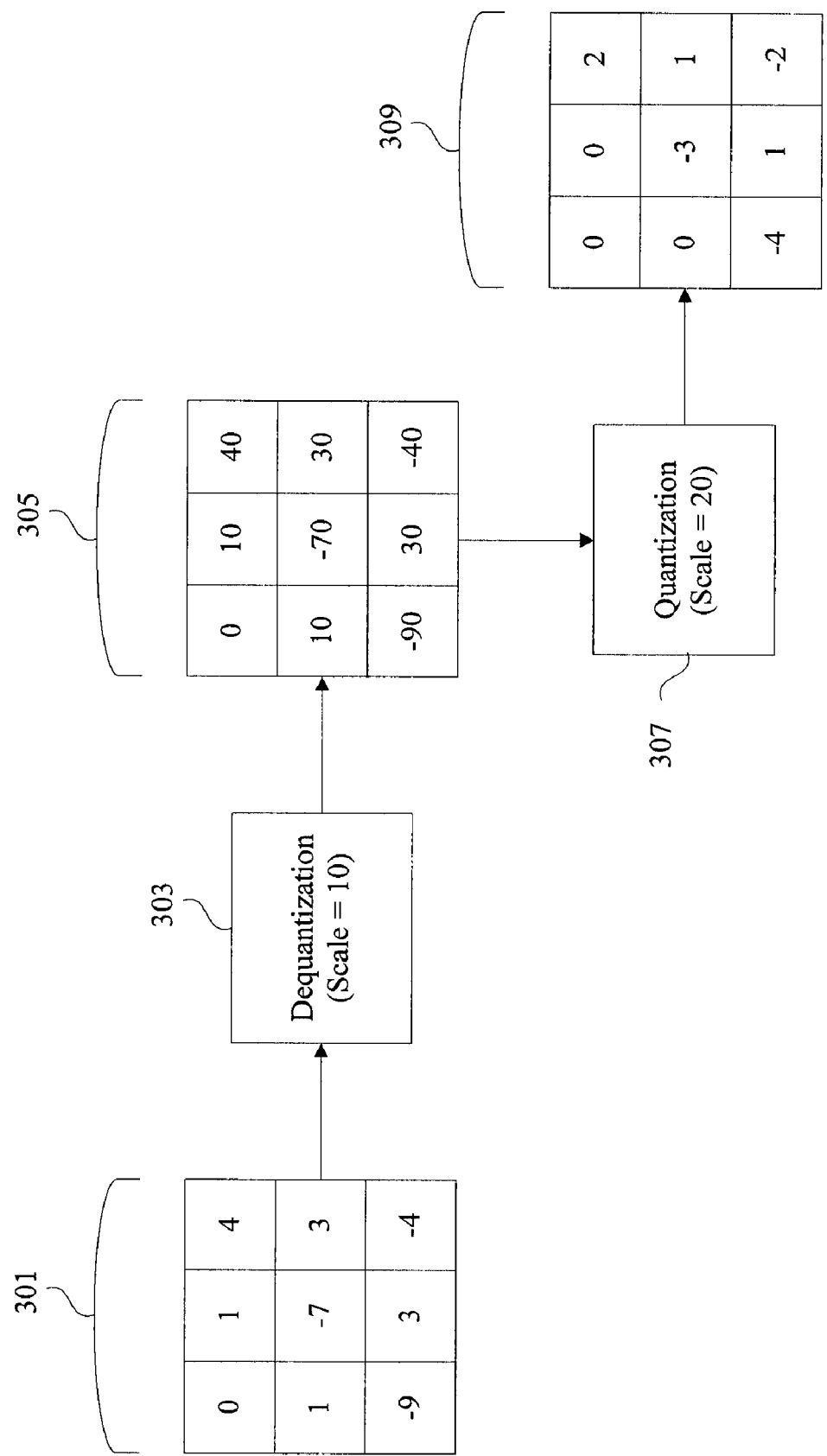
FIG. 3 is a diagrammatic representation showing a typical technique used for requantization.

In some examples, dequantization is used as a part of requantization. In some cases, a compressed bitstream of quantized coefficients may have to be compressed further to further reduce the bit rate. FIG. 3 is a diagrammatic representation showing requantization. Requantization typically entails the use of a larger quantization scale to further reduce the number of bits needed to represent coefficient values. In many instances, coefficients in matrix 301 quantized at a particular scale are dequantized at 303 to provide dequantized coefficients in matrix 305.

According to the MPEG-2 standard, dequantization is performed using the following formula:

$$f=((2F+k) \cdot q \cdot w)/32); \qquad \text{(Formula 1)}$$

where F=quantized coefficient,
f=dequantized coefficient,
k=0 for intra macroblocks,
k=sign(F) for inter macroblocks,
q=quantization scale,
"/" denotes integer division with truncation of the result toward zero,
w=weighting factor, and
sign(F) is −1, 0 and 1 if F<0, F=0 and F>0 respectively.

Applying a formula like Formula 1 to each of the quantized coefficients in matrix 301 yields dequantized coefficients in matrix 305. The dequantized coefficients in matrix 305 are then requantized using a larger scale at 507 to provide requantized coefficients in matrix 309. The quantized coefficients in matrix 301 range from −9 to 9 (19 different levels). Each of the quantized coefficients be represented by 5 bits. The requantized coefficients in matrix 309 range from −4 to 4 (9 different levels). Each of the requantized coefficients can be represented using only 4 bits.

Consequently, the greater the quantization scale or step size, the smaller the number of quantization levels needed to cover the same data range. With fewer quantization levels, fewer bits are needed to represent the quantization levels. For example, only 3 bits are needed to represent 8 levels but 4 bits are needed to represent 9 levels. Consequently the bitrate of a video stream can be reduced if the quantization scale is increased. There are many examples when the bitrate of a data stream needs to be further reduced.

Figure 4:
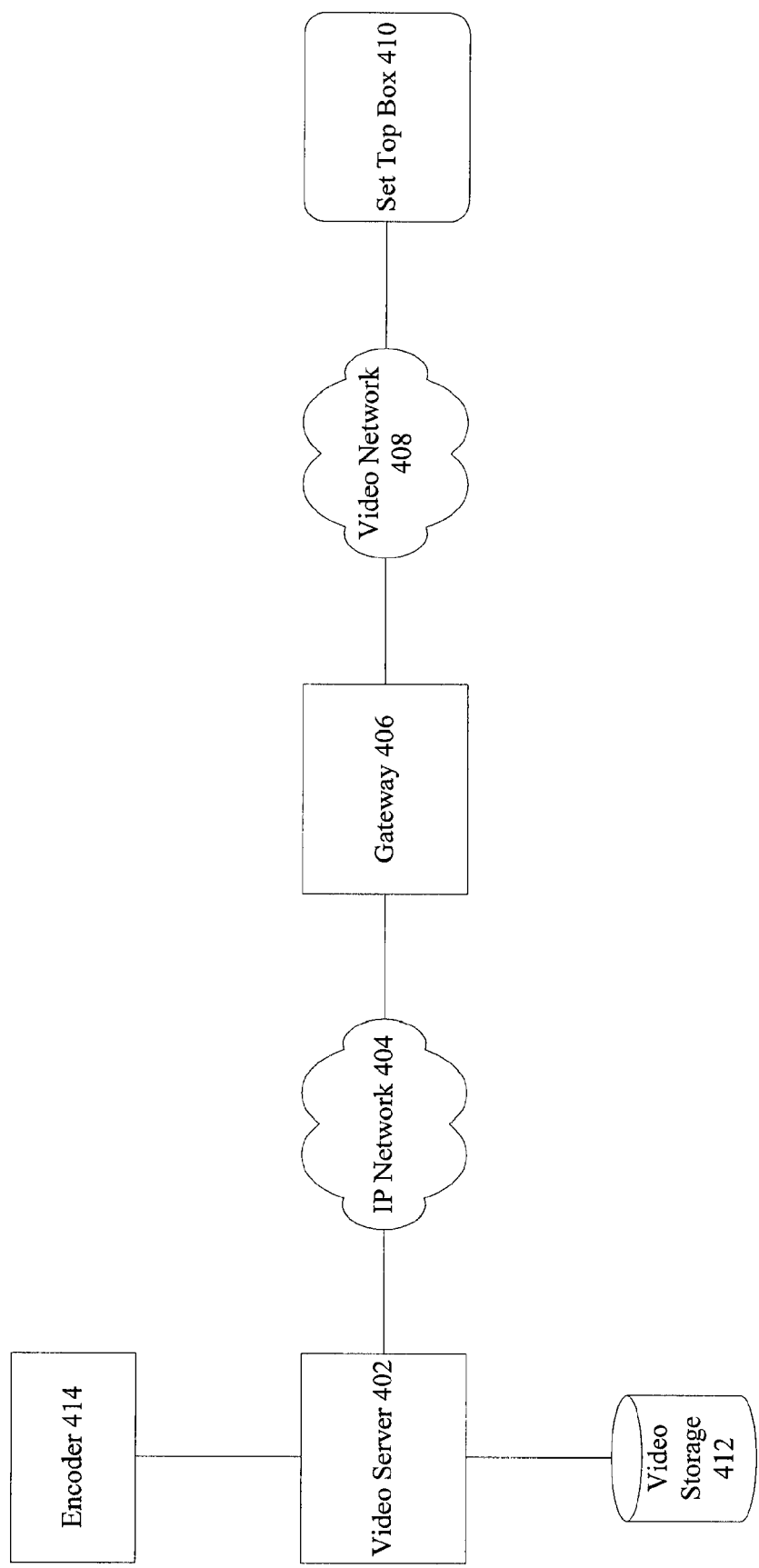
FIG. 4 is a diagrammatic representation of a network that can use the techniques of the present invention.

FIG. 4 is a diagrammatic representation of a system that can apply requantization to further reduce the bitrate of a data stream. FIG. 4 shows a system 106 that couples network 404 and network 408. According to various embodiments, network 404 has one set of constraints while network 408 has a more restrictive set of constraints. For example, network 404 may allow transmission at a higher bit rate than network 408. A system 406 receiving encoded content can reduce or rescale the content to allow transmission onto network 408. In one example, the bandwidth allocated on a network 401 to a particular user is 1 Mbps while the bandwidth allocated for transmission on network 408 for the same user is 0.8 Mbps. A real-time video stream transmitted from one network to another may benefit from improved techniques for rescaling the video stream to comply with the more restrictive constraints of network 408. In one example, network 104 is a video network connected to a video server 102 with an encoder 114 and associated video storage 112. Network 108 is coupled to the system 106 and a set top box 110.

In common embodiments, system 406 can be part of a network device such as a gateway, router, switch, or cable network headend equipment connecting two different networks or networks having different network constraints. According to various embodiments, the encoded content is an MPEG bitstream. Note that the invention is not limited to an application to MPEG compression, or even the video compression techniques generally. Rather the invention is applicable to any type of content in which transform coefficients are used to represent portions of content. Furthermore, the coefficients can be selected based upon the type of untransformed content they represent (e.g. high frequency vs. low-frequency spatial features of an image or an audio sample).

For convenience, the invention will be described in the context of MPEG-2 compression and bit rate reduction in an MPEG-2 video stream. The size of an MPEG bitstream can be reduced by filtering the transform coefficients in each MPEG frame. A system 406 can then apply a reduction ratio of 0.8 to the encoded content by using a variety of techniques including filtering coefficients and requantization. As will be appreciated by one of skill in the art, the bitstream coefficients are typically dequantized before they are again quantized at a larger quantization scale. The techniques of the present invention allow requantization of coefficients in a data sequence without dequantization of coefficients.

Figure 5:
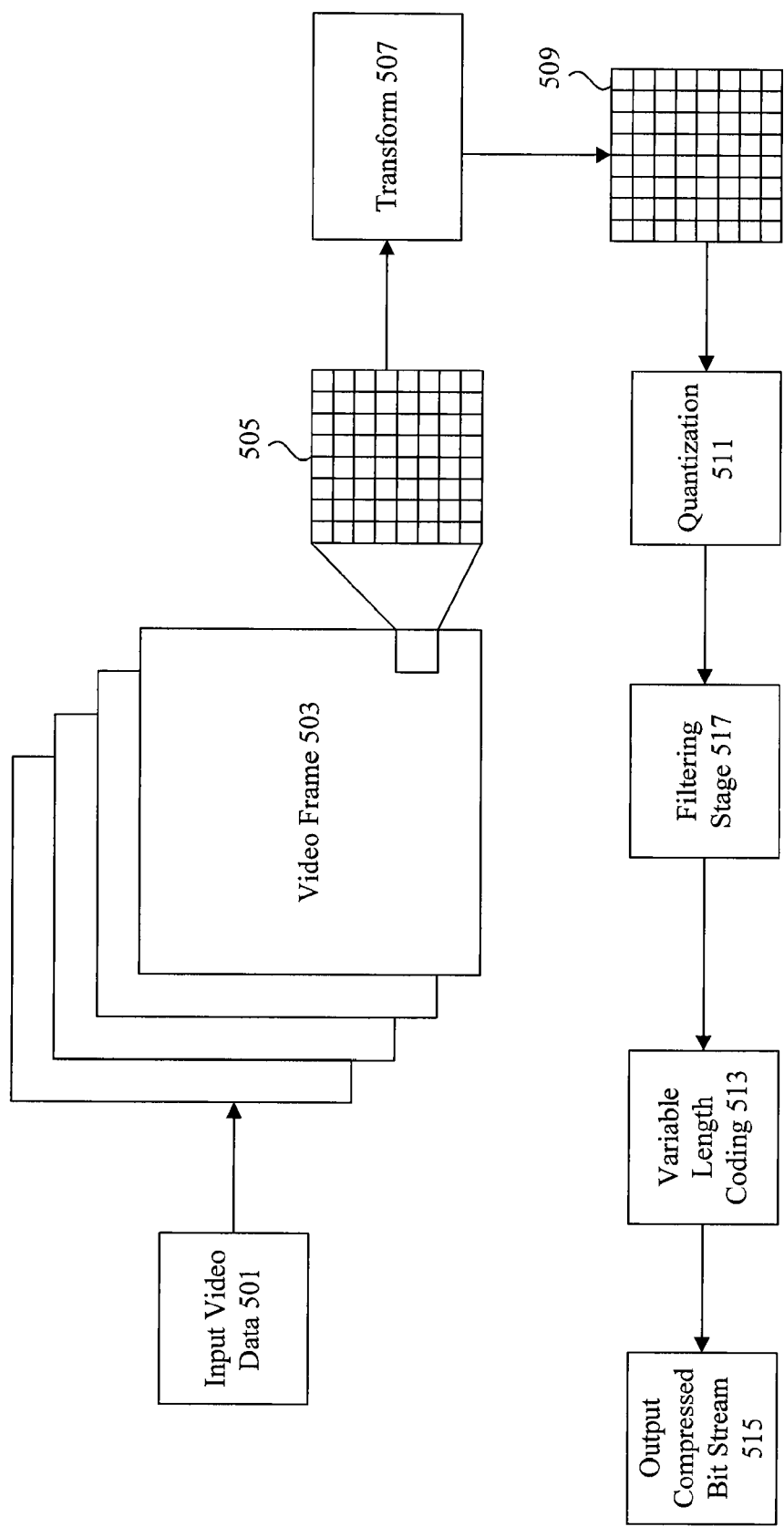
FIG. 5 is a diagrammatic representation showing video frames and coefficients.

FIG. 5 describes a system for generating transform coefficients in MPEG frames. As will be appreciated by one of skill in the art, the basic structure for a coded video frame or picture is a block that is an 8 pixel by 8 pixel array. Multiple blocks form a macroblock, which in turn form part of a slice. A coded frame consists of multiple slices. Multiple coded frames form a group of frames. Such hierarchical layering of data structures localizes the most basic processing on the lowest layer, namely blocks and macroblocks.

As noted above, each block contains variable length codes for DCT coefficients. In the MPEG-2 syntax, the picture data section contains the bulk of the compressed video images. This is where the DCT coefficients are encoded as variable length codes. For a typical bitstream, this portion of the data takes somewhere between 70%-90% of the total bit usage of a coded picture, depending on the coded bit rate.

The access unit level information relates to coded pictures and may specify whether a picture is an intra frame (I-frame), a predicted frame (P-frame), or a bi-directional frame (B-frame). I-frames associated with intra macroblocks contain full picture information. P-frames associated with inter macroblocks are constructed using past I-frames or P-frames. A bi-directional frame (B-frame) associated with inter macroblocks are bi-directionally constructed using both a past and a future I or P-frame, which are also called anchor frames.

Each video frame 503 can be represented by luminance and chrominance pixels corresponding to input video data 501. The techniques of the present invention apply regardless of the type of frame or the type of pixel. Block 505 contains values corresponding to a portion of video frame 503. A transform operation is then performed on the values in block 505 to derive coefficients in block 509. Block 509 is then compressed using a variety of techniques. According to various embodiments, coefficients in block 509 are first quantized using a first quantization scale at 511. Block 505 is passed to a filtering stage 517. Filtering stage 517 removes particular coefficients to further allow bitrate reduction. Filtering transform coefficients can comprise zeroing the transform coefficients or setting the transform coefficients to a particular sequence of numbers. Often frequency can be used as a filtering criteria for the coefficients. Of course, other criteria such as computational convenience, etc. can be used to select coefficients for filtering. Filtered coefficients can then be passed to a variable length coder 513 to allow replacement of sequences of bits with shorter sequences of bits. The output bitstream is then provided at 515.

The techniques of the present invention allow rate reduction of bit streams generated using compression mechanisms such as that described in FIG. 5. Rate reduction may be used at a gateway between two different networks with different bit rate requirements. Rate control may entail requantization or additional filtering of coefficients. However, the techniques of the present invention recognize that using requantization can often introduce additional error into a bitstream. Consequently, the techniques of the present invention seek to minimize the error introduced into a bitstream using more effective requantization formulas.

Figure 6:
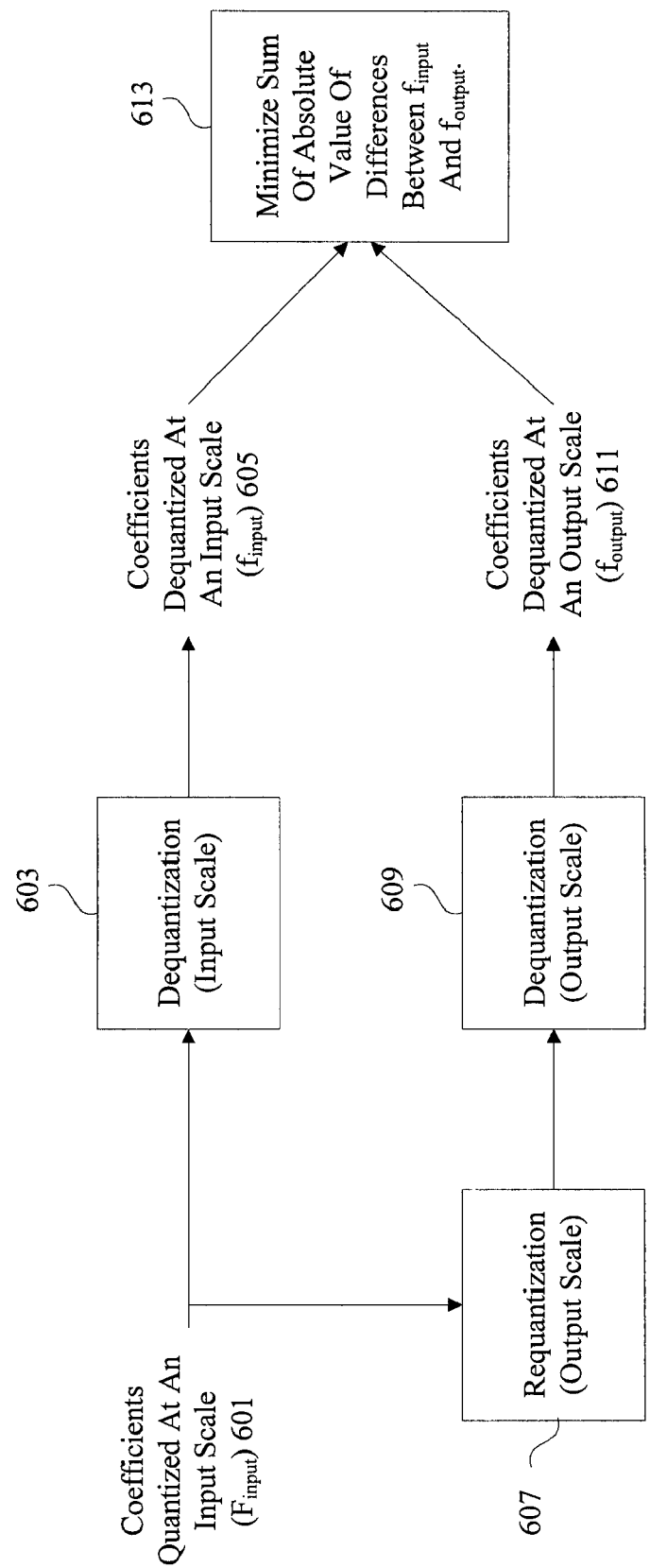
FIG. 6 is a diagrammatic representation showing a diagram for comparing quantization error.

FIG. 6 is a diagrammatic representation used to compare quantization error. Coefficients quantized ($F_{input}$, or $F_i$) at an input quantization scale ($q_i$) are provided at 601. In one example, the input quantization scale is the quantization scale used to original quantize transform coefficients. The coefficients 601 are requantized using a typically higher output quantization scale ($q_o$) at 607. The coefficients 601 are also dequantized using $q_i$ at 603 to yield coefficients dequantized at the input quantization scale ($f_{input}$ or $f_i$). Coefficients requantized ($F_{output}$ or $F_o$) at $q_o$ are dequantized at 609 to yield coefficients ($f_{output}$ or $f_o$) dequantized at $q_o$. To determine an optimal mechanism for requantizing coefficients at 607, the problem becomes minimizing the absolute value of the sum of differences between $f_i$ and $f_o$.

The problem can be represented as follows:

$$\min |f_i - f_o| \quad \text{(Formula 2)}$$

Combining Formula 1 and Formula 2 yields the following formula:

$$\min |((2F_i + k_i) \cdot q_i \cdot w)/32 - ((2F_o + k_o) \cdot q_o \cdot w)/32|; \quad \text{(Formula 3)}$$

where $F_i$=coefficient quantized at input quantization scale,
$F_o$=coefficient requantized at output quantization scale,
$k_i=k_o=0$ for intra macroblocks,
$k_i=\text{sign}(F_i)$ for inter macroblocks,
$k_o=\text{sign}(F_o)$ for inter macroblocks,
$q_i$=input quantization scale,
$q_o$=output quantization scale,
"/" denotes integer division with truncation of the result toward zero, and
w=weighting factor.

To solve formula 3 more efficiently, a linearized version of formula 3 is considered. The "/" operation is replaced with true division, and non-integer values are allowed for $F_o$. Common factors can also be removed. Formula 3 can now be simplified to the following formula:

$$\min |(2F_i+k_i) \cdot q_i - (2F_o+k_o) \cdot q_o|; \quad \text{(Formula 4)}$$

where $F_i$=coefficient quantized at input quantization scale,
$F_o$=coefficient requantized at output quantization scale,
$k_i=k_o=0$ for intra macroblocks,
$k_i=\text{sign}(F_i)$ for inter macroblocks,
$k_o=\text{sign}(F_o)$ for inter macroblocks,
$q_i$=input quantization scale, and
$q_o$=output quantization scale.

By setting the objective function to 0, we have the following formula:

$$\tilde{F}_o = \frac{1}{2}[2rF_i + rk_i - k_o]; \quad \text{(Formula 5)}$$

where $F_i$=coefficient quantized at input quantization scale,
$\tilde{F}_o$=noninteger coefficient requantized at output quantization scale,
$k_i=k_o=0$ for intra macroblocks,
$k_i=\text{sign}(F_i)$ for inter macroblocks,
$k_o=\text{sign}(F_o)$ for inter macroblocks, and
$r=q_i/q_o$=input quantization scale divided by output quantization scale.

For intra macroblocks, $k_i$ and $k_o$ both go to zero and we have the following formula:

$$\tilde{F}=rF_i; \quad \text{(Formula 6)}$$

where $F_i$ coefficient quantized at input quantization scale,
$\tilde{F}_o$=noninteger coefficient requantized at output quantization scale, and
$r=q_i/q_o$=input quantization scale divided by output quantization scale.

For inter macroblocks, if $F_i=0$, then $k_i$ and $k_o$ both go to zero and hence $\tilde{F}_o=0$. However, if $F_i$ does not equal, then either $k_i=k_o$ or $k_o$ becomes zero as $\tilde{F}_o$ goes to zero. Applying another simplification, $k_i$ is assumed equal to $k_o$. This simplification tends to bias the decision of $\tilde{F}_o$ toward 0. By assuming $k_i=k_o$, we have the following formula:

$$\tilde{F}_o = \frac{k_i}{2}[2r|F_i| + r - 1]; \quad \text{(Formula 7)}$$

where $F_i$=coefficient quantized at input quantization scale,
$\tilde{F}_o$=noninteger coefficient requantized at output quantization scale,
$k_i=k_o$,
$r=q_i/q_o$=input quantization scale divided by output quantization scale.

After we find the solution $\tilde{F}_o$ to the linearized problem, the solution to the requantization problem can be approximated by rounding the result to the nearest integer, with midpoints rounded towards 0.

$$F_o=\text{round}(\tilde{F}_o) \quad \text{(Formula 8)}$$

where $\tilde{F}_o$=noninteger coefficient requantized at output quantization scale, and
"round" is rounding to the nearest intger with midpoints toward 0.

Combining formulas 6 and 8 yields the following formula for intra macroblocks:

$$F_o=\text{round } rF_i; \quad \text{(Formula 9)}$$

where $F_i$=coefficient for intra macroblock quantized at input quantization scale,
$F_o$=integer coefficient requantized at output quantization scale,
"round" is rounding to the nearest intger with midpoints toward 0, and
$r=q_i/q_o$=input quantization scale divided by output quantization scale.

Combining formula 7 and 8 yields the following formula for inter macroblocks:

$$F_o = \text{round}\left(\frac{k_i}{2}[2r|F_i| + r - 1]\right) \quad \text{(Formula 10)}$$

where $F_i$=coefficient quantized at input quantization scale,
$F_o$=integer coefficient requantized at output quantization scale,
"round" is rounding to the nearest intger with midpoints toward 0,
$k_i=k_o$, and
$r=q_i/q_o$=input quantization scale divided by output quantization scale.

Figure 7:
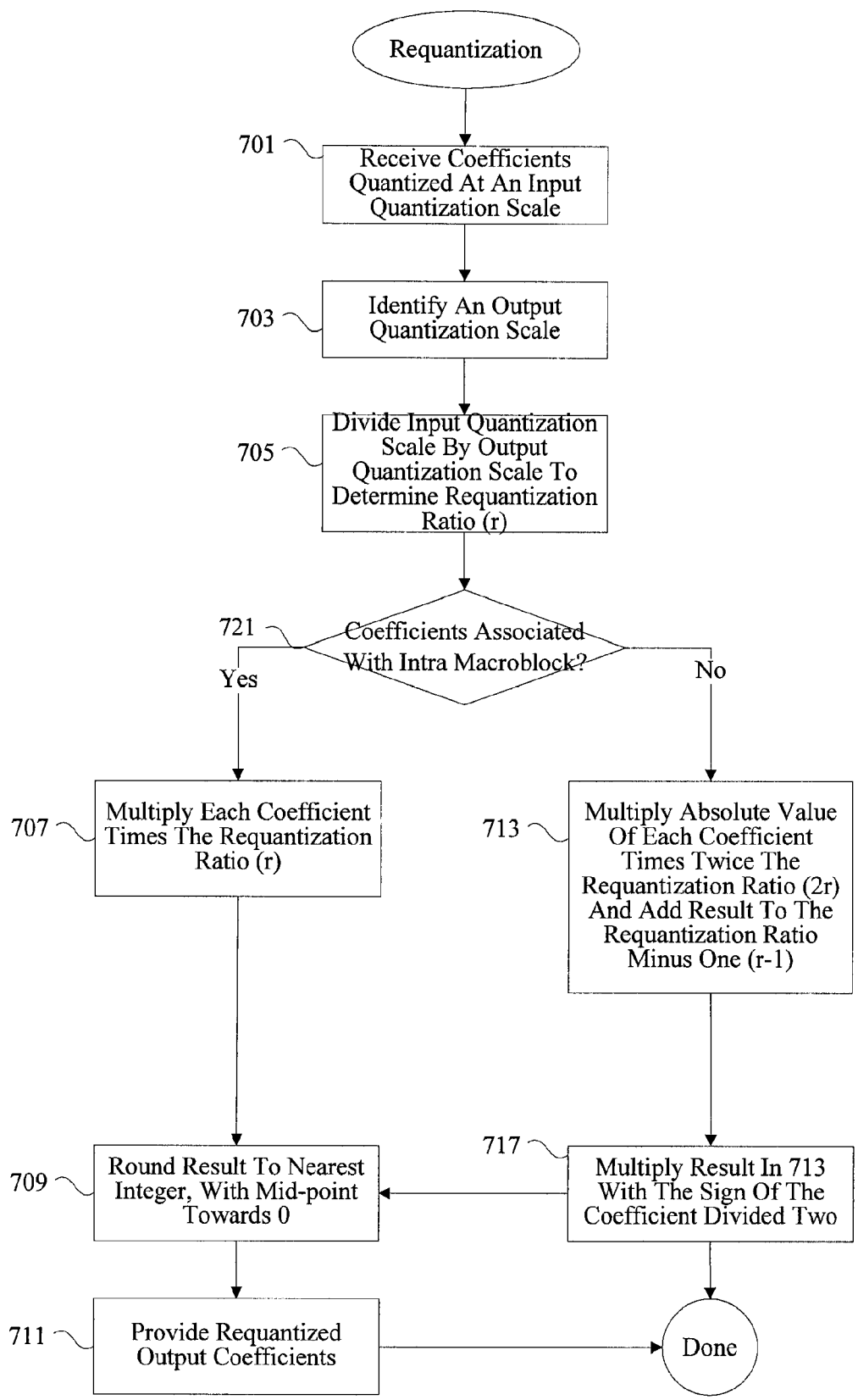
FIG. 7 is a flow process diagram showing a technique for minimizing quantization error.

Formulas 9 and 10 allow derivation of requantized coefficient transforms with minimized quantization error. FIG. 7 is a flow process diagram showing one example of requantization using formulas 9 and 10.

At 701, coefficients quantized at an input quantization scale are received. In one example, the quantized coefficients are received at a rate control server. Any mechanism for performing requantization is referred to herein as a rate control server. The coefficients may initially have been quantized at a video server. At 703, and output quantization scale is determined. The rate control server may determine the output quantization scale based on the rate reduction to be applied to the bitstream associated with the quantized coefficients. At 705, the input quantization scale is divided by the output quantization scale to determine the requantization ratio. The value resulting from division of an input quantization scale by an output desired quantization scale is referred to herein as a requantization ratio. According to various embodiments, the requantization ratio is not rounded.

At 721 it is determined if the coefficients are associated with an intra macroblock. If the coefficient is associated with an intra or block, a formula such as Formula 9 is applied. However, if the coefficients are associated with an inter macroblock, a formula such as Formula 10 is applied. At 707, if the coefficients are associated with an intra macroblock, each coefficient is multiplied by the requantization ratio. If the coefficients are associated with an inter macroblock, the absolute value of each coefficient times twice the requantization ratio added to the requantization ratio minus one is determined. This result is then multiplied with the sign of the coefficient divided by two at 717. At 709, results are rounded to the nearest integer, with midpoints rounded towards 0. For example, −4.5 would be rounded to −4. At 711, requantized output coefficients are provided. In one example, requantized output coefficients are provided for transmission onto a network. In another example, requantization is applied in conjunction with filtering of transform coefficients to allow for the rate reduction.

The techniques of the present invention for filtering transform coefficients to provide rate reduction in a bitstream can be implemented in various network systems. In various embodiments, a rate control server can be implemented in the headend of high bandwidth networks such as a cable network or a satellite network. In the context of a cable network, the invention is implemented in a standalone system, such as Cisco 6920 RateMux® available from Cisco Systems, Inc, or in a line card of a cable modem headend such as the Cisco UBR 7200 also available from Cisco Systems, Inc.

Figure 8:
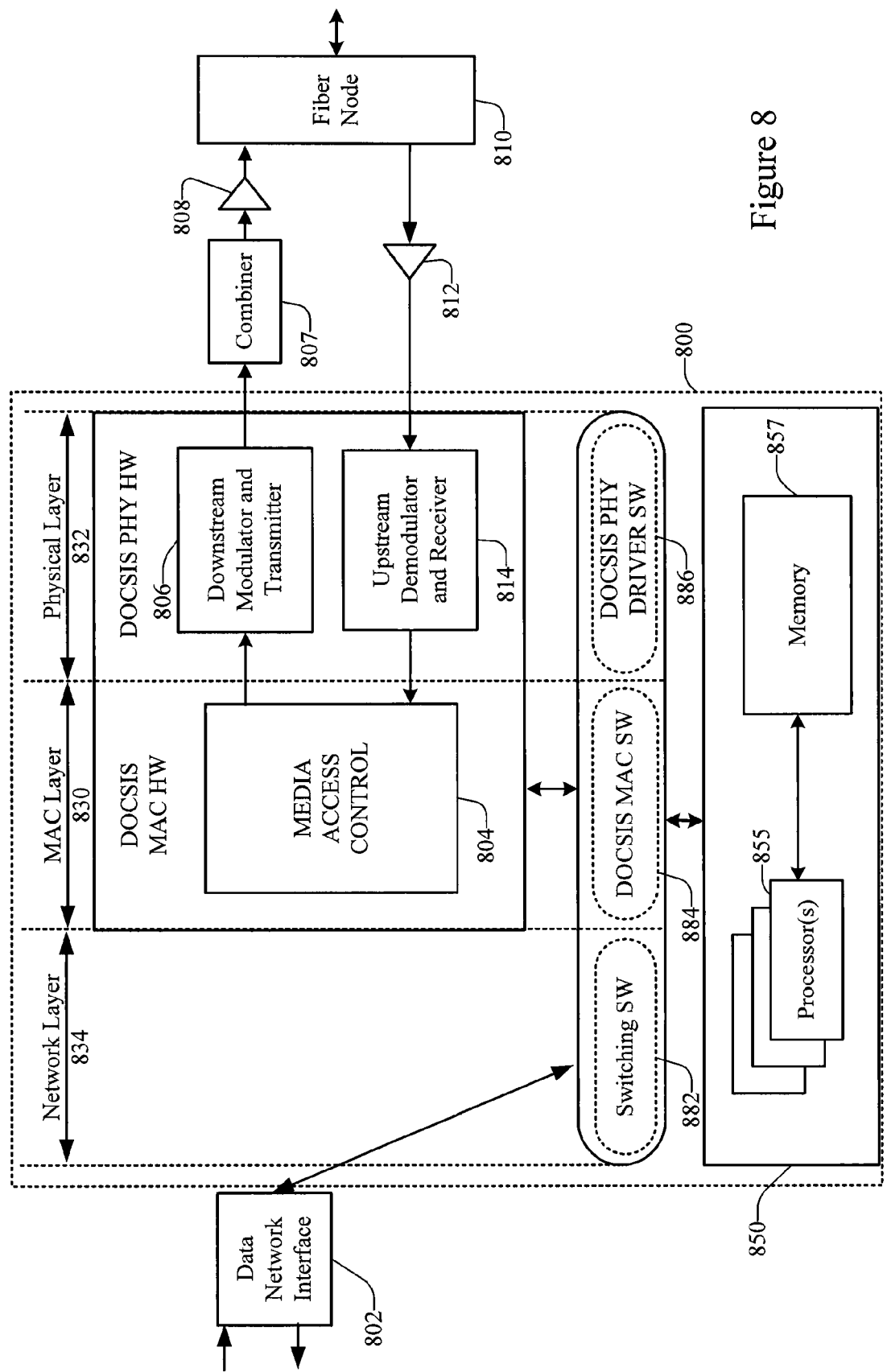
FIG. 8 is a diagrammatic representation of a switch that can be used to implement the techniques of the present invention.

FIG. 8 depicts the basic components of a cable modem headend that can be used to implement the present invention, according to specific embodiments. Although the techniques of the present invention can be integrated into a cable modem headend, the present invention can also be used in a standalone system. FIG. 8 shows an implementation using the cable modem headend.

A Data Network Interface 802 is an interface component between an external data source and the cable system. External data sources transmit data to data network interface 802 via optical fiber, microwave link, satellite link, or through various other media. Also as mentioned above, a Media Access Control Block (MAC Block) 804 receives data packets from a Data Network Interface 802 and encapsulates them with a MAC header.

In a specific embodiment as shown in FIG. 8, CMTS provides functions on three network layers including a physical layer 832, a Media Access Control (MAC) layer 830, and a network layer 834. Generally, the physical layer is responsible for receiving and transmitting RF signals on the cable plant. Hardware portions of the physical layer include a downstream modulator and transmitter 806 and an upstream demodulator and receiver 814. The physical layer also includes software 886 for driving the hardware components of the physical layer.

Once an information packet is demodulated by the demodulator/receiver 814, it is then passed to MAC layer 830. A primary purpose of MAC layer 830 is to encapsulate and decapsulate packets within a MAC header, preferably according to the above-mentioned DOCSIS standard for transmission of data or other information.

MAC layer 830 includes a MAC hardware portion 804 and a MAC software portion 884, which function together to encapsulate information packets with the appropriate MAC address of the cable modem(s) on the system. After the upstream information has been processed by MAC layer 830, it is then passed to network layer 834. Network layer 834 includes switching software 882 for causing the upstream information packet to be switched to an appropriate data network interface on data network interface 802.

When a packet is received at the data network interface 802 from an external source, the switching software within network layer 834 passes the packet to MAC layer 830. MAC block 804 transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 807. Converter 808 converts the modulated RF electrical signals to optical signals that can be received and transmitted by a Fiber Node 810 to the cable modem hub.

It is to be noted that alternate embodiments of the CMTS (not shown) may not include network layer 834. In such embodiments, a CMTS device may include only a physical layer and a MAC layer, which are responsible for modifying a packet according to the appropriate standard for transmission of information over a cable modem network. The network layer 834 of these alternate embodiments of CMTS devices may be included, for example, as part of a conventional router for a packet-switched network.

In a specific embodiment, the network layer of the CMTS is configured as a cable line card coupled to a standard router that includes the physical layer 832 and MAC layer 830. The techniques of the present invention including requantization mechanisms can be implemented on a line card. Using this type of configuration, the CMTS is able to send and/or receive IP packets to and from the data network interface 802 using switching software block 882. The data network interface 802 is an interface component between external data sources and the cable system. The external data sources transmit data to the data network interface 802 via, for example, optical fiber, microwave link, satellite link, or through various media. The data network interface includes hardware and software for interfacing to various networks such as, for example, Ethernet, ATM, frame relay, etc.

As shown in FIG. 8, the CMTS includes a hardware block 850 including one or more processors 855 and memory 857. These hardware components interact with software and other hardware portions of the various layers within the CMTS. Memory 857 may include, for example, I/O memory (e.g. buffers), program memory, shared memory, etc. Hardware block 850 may physically reside with the other CMTS components.

In one embodiment, the software entities 882, 884, and 886 are implemented as part of a network operating system running on hardware 850. Further, the provisions of this invention for requantizing coefficients may be implemented in software as part of the operating system.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. For example, the headend has a variety of embodiments which include a cable modem termination system coupled to a router or a multicast router. A cable modem can also be a separate entity or entirely integrated into a client system. In addition and as mentioned above, the invention may be implemented in both differential and single-ended configurations. Therefore, the scope of the invention should be determined with reference to the appended claims.

What is claimed is:

1. A method, comprising:
using an interface for receiving a plurality of input coefficients ($F_i$) quantized at an input quantization scale ($q_i$), the input coefficients associated with the bit stream received at a network device configured to perform requantization;
using a processor for selecting an output quantization scale ($q_o$), wherein the output quantization scale is greater than the input quantization scale to allow for rate reduction of the bit stream, wherein the output quantization scale ($q_o$) is selected by determining the absolute value of the sum of differences between dequantized input coefficients ($f_i$) and dequantized output coefficients ($f_o$; and
further using the interface for transmitting a plurality of output coefficients ($F_o$) quantized at the output quantization scale ($q_o$).

2. The method of claim 1, wherein the quantized coefficients are DCT coefficients of an MPEG encoded bitstream.

3. The method of claim 1, wherein the plurality of input coefficients are associated with an intra macroblock or an inter macroblock.

4. The method of claim 1, wherein the output quantization scale has a larger step size than the input quantization scale.

5. The method of claim 1, wherein input and output coefficients are dequantized using the following formula:

$$f=((2F+k)\cdot q\cdot w)/32);$$

where k=0 for intra macroblocks,
k=sign(F) for inter macroblocks,
"/" denotes integer division with truncation of the result toward zero,
w=weighting factor, and
sign(F)=−1, 0, or 1 if F<0, F=0, and F>0 respectively.

6. The method of claim 1, wherein the formula minimizes requantization error.

7. The method of claim 6, wherein requantization error is minimized using the following formula:

$$q_{error}=\min|(2F+k_i)\cdot q_i\cdot w)/32-(2F_o+k_o)\cdot q_o\cdot w)/32|;$$

where k=0 for intra macroblocks,
k=sign(F) for inter macroblocks,
"/" denotes integer division with truncation of the result toward zero,
w=weighting factor, and
subfix i and o in F, k and q represent input and output values respectively.

8. The method of claim 3, wherein output quantized coefficients associated with intra macroblocks are calculated using the following formula:

$$F_o=\text{round}(rF_i);$$

where r is equal to the input quantization scale divided by the output quantization scale and the round function rounds the result to the nearest integer.

9. The method of claim 8, wherein midpoints are rounded toward 0.

10. The method of claim 3, wherein output quantized coefficients associated with inter macroblocks are calculated using the following formula:

$$F_o = \text{round}\left(\frac{k_i}{2}[2r|F_i|+r-1]\right);$$

where r is equal to the input quantization scale divided by the output quantization scale and the round function rounds the result to the nearest integer.

11. The method of claim 10, wherein midpoints are rounded toward 0.

12. An apparatus, comprising:
an interface configured to receive a plurality of input coefficients ($F_i$) quantized at an input quantization scale ($q_i$), the input coefficients associated with the bit stream received at a network device configured to perform requantization;
a processor configured to select an output quantization scale ($q_o$), wherein the output quantization scale is greater than the input quantization scale to allow for rate reduction of the bit stream, wherein the output quantization scale ($q_o$) is selected by determining the absolute value of the sum of differences between dequantized input coefficients ($f_i$) and dequantized output coefficients ($f_o$);
wherein the interface is further configured to transmit a plurality of output coefficients ($F_o$) quantized at the output quantization scale ($q_o$).

13. The apparatus of claim 12, wherein the quantized coefficients are DCT coefficients of an MPEG encoded bitstream.

14. The apparatus of claim 12, wherein the plurality of input coefficients are associated with an intra macroblock or an inter macroblock.

15. The apparatus of claim 12, wherein the output quantization scale has a larger step size than the input quantization scale.

16. The apparatus of claim 12, wherein input and output coefficients are dequantized using the following formula:

$$f=((2F+k)\cdot q\cdot w)/32);$$

where k=0 for intra macroblocks,
k=sign(F) for inter macroblocks,
"/" denotes integer division with truncation of the result toward zero,
w=weighting factor, and
sign(F)=−1, 0, or 1 if F<0, F=0, and F>0 respectively.

17. The apparatus of claim 12, wherein the formula minimizes requantization error.

18. The apparatus of claim 17, wherein requantization error is minimized using the following formula:

$$q_{error}=\min|(2F+k_i) \cdot q_i \cdot w)/32-(2F+k_o) \cdot q_o \cdot w)/32|;$$

where k=0 for intra macroblocks,
k=sign(F) for inter macroblocks,
"/" denotes integer division with truncation of the result toward zero,
w=weighting factor, and
subfix i and o in F, k and q represent input and output values respectively.

19. The apparatus of claim 14, wherein output quantized coefficients associated with intra macroblocks are calculated using the following formula:

$$F_o=\text{round}(rF_i);$$

where r is equal to the input quantization scale divided by the output quantization scale and the round function rounds the result to the nearest integer.

20. An apparatus, comprising:

means for receiving a plurality of input coefficients ($F_i$) quantized at an input quantization scale ($q_i$), the input coefficients associated with the bit stream received at a network device configured to perform requantization;

means for selecting an output quantization scale ($q_o$), wherein the output quantization scale is greater than the input quantization scale to allow for rate reduction of the bit stream, wherein the output quantization scale ($q_o$) is selected by determining the absolute value of the sum of differences between dequantized input coefficients ($f_i$) and dequantized output coefficients ($f_o$); and means for transmitting a plurality of output coefficients ($F_o$) quantized at the output quantization scale ($q_o$).

* * * * *